United States Patent [19]

Orlandi

[11] Patent Number: 5,234,020
[45] Date of Patent: Aug. 10, 1993

[54] MIXER VALVE FOR HOT AND COLD WATER WITH TWO INDEPENDENT CONTROLS

[75] Inventor: Alessio Orlandi, Castiglione D/Stiviere, Italy

[73] Assignee: Galatron S.r.l., Castiglione D/Stiviere, Italy

[21] Appl. No.: 852,293

[22] Filed: Mar. 16, 1992

[30] Foreign Application Priority Data

Mar. 21, 1991 [IT] Italy .................. BS91A000030

[51] Int. Cl.$^5$ .................................................. F16K 11/20
[52] U.S. Cl. ........................... 137/454.2; 137/606; 137/625.31
[58] Field of Search ............... 137/606, 625.3, 625.31, 137/625.32, 454.6, 454.2

[56] References Cited

U.S. PATENT DOCUMENTS

| | | | |
|---|---|---|---|
| 1,965,833 | 7/1934 | Geddes | 137/606 X |
| 3,831,621 | 8/1974 | Anthony et al. | 137/454.6 X |
| 4,331,176 | 5/1982 | Parkison | 137/625.31 X |
| 4,651,770 | 3/1987 | Denhom et al. | 137/625.31 X |

FOREIGN PATENT DOCUMENTS

2241731  3/1975  France .................. 137/606

Primary Examiner—Stephen M. Hepperle
Attorney, Agent, or Firm—McGlew and Tuttle

[57] ABSTRACT

The present invention relates to a mixer valve for hot and cold water with two independent controls for the two types of water to be delivered, having a fixed plate (23) with at least a first slit (24) for the inlet of hot water and at least a second slit (25) for the inlet of cold water, and on said fixed plate (23) a first rotating disk (26) in correspondence to the first slit (24) and a second rotating disk (27) in correspondence to the second slit (25), each disk (26, 27) having at least one slit (26a, 27a) positionable in correspondence to and away from the respective slit (24, 25) of said fixed plate (23) following the rotation of the disks through a control element (19, 20) in the cartridge-type body (10).

4 Claims, 2 Drawing Sheets

MIXER VALVE FOR HOT AND COLD WATER WITH TWO INDEPENDENT CONTROLS

The present invention relates to mixer valves for hot and cold water in sanitary units, and more particularly to mixer valves with a cartridge-type body which holds valvular means made from ceramic plates or the like.

At the present state of the arts, cartridge-type mixer valves with a single control are known on one hand, whilst on the other hand there are mixers having two screw-type valves which are either independently or jointly controlled.

As valvular means, the single control mixer valves usually have a fixed plate inside the cartridge-type body having openings which are respectively for the inlet of hot and cold water coming from separate pipes and a water outlet hole towards the water delivery mouth, and have a mobile plate which is positionable on the fixed one through an operating lever. The mobile plate normally has a mixing chamber which is positionable either far from or in partial or total correspondence to the openings of the fixed plate so as to control the delivery of water.

In order that the mobile plate can be positioned on the fixed plate, it is susceptible to translating and rotating movements, which can also be combined. These movements are obtained through the operating layer fitted into the cartridge-type body with the possibility of oscillation on a transversal axis and of rotating around a verticle axis. In practice, the adjusting and intercepting of the flow of water in said valves depend on a single operating handle which must have two movement: oscillation and rotation. Furthermore, controlling by a single lever can be the cause of possible water wastages, especially hot water, with both energy and economical disadvantages. The reason for this is that the user has no way of immediately and definitely determining the type of water which is to be delivered to the opening of the valve.

The controls for hot and cold water in mixers having two screw-type valves can be seperate but the screw-type valves used are completely independent in construction, installation and operating. Furthermore, these mixers cannot be fitted in the place of or in substitution to the traditional single control valves.

The present invention aims to supply a new type of mixing valve for hot and cold water where the characteristics of the single control valve as far as the configuration of the cartridge-type body and the inlet of hot and cold water are concerned are coupled with the characteristics of the screw-type valve as far as operating, by independent controls, the delivery and mixing of the hot and cold water, is concerned.

The mixer valve of the present invention is substantially in accordance with claim 1.

The mixer valve here proposed has the following advantages:

it can be fitted into any tap body and used in substitution of the traditional single control cartridge-type mixer valves;

it includes a single valvular means fixed and interacting with two mobile valvular elements which are independently controlled so as to respectively deliver hot and cold water;

it therefore has two independent controls in the same cartridge-type body which are rotated for the orientation of the mobile valvular elements on the fixed valvular means;

the two independent controls can be fitted with operating elements being either a lever, gears, a handle or of any other configuration for their seperate movements;

the cartridge-type body and the components of the control means can be made of plastic materials in that they are not subject to severe deliveries as in single control valves; and finally, it simplifies the structure of the mixer valves, also with a possibility of an improved control of the type of water delivered and of the ratios of mixing so as to avoid wastages, in that the operating means for each control will inevocably indicate the condition of the valve and the delivery condition can only be modified by voluntary acting on one, on the other or on both controls at the same time.

Further details of the invention will appear clearer following the description with references being made to the attached drawings in which.

The here proposed mixer valve has a cartridge-type body (10) with a base (11) and lid (12) made of a moulded plastic material.

When the elements inside the valve are fitted from the bottom, the lid (12) is integral to the body (10) and the base (11) is snapped on to said body; when the elements inside the valve are fitted from the top of the body, the base (11) is integral to the body (10) and the lid (12) is snapped on to said body.

Figure 1:
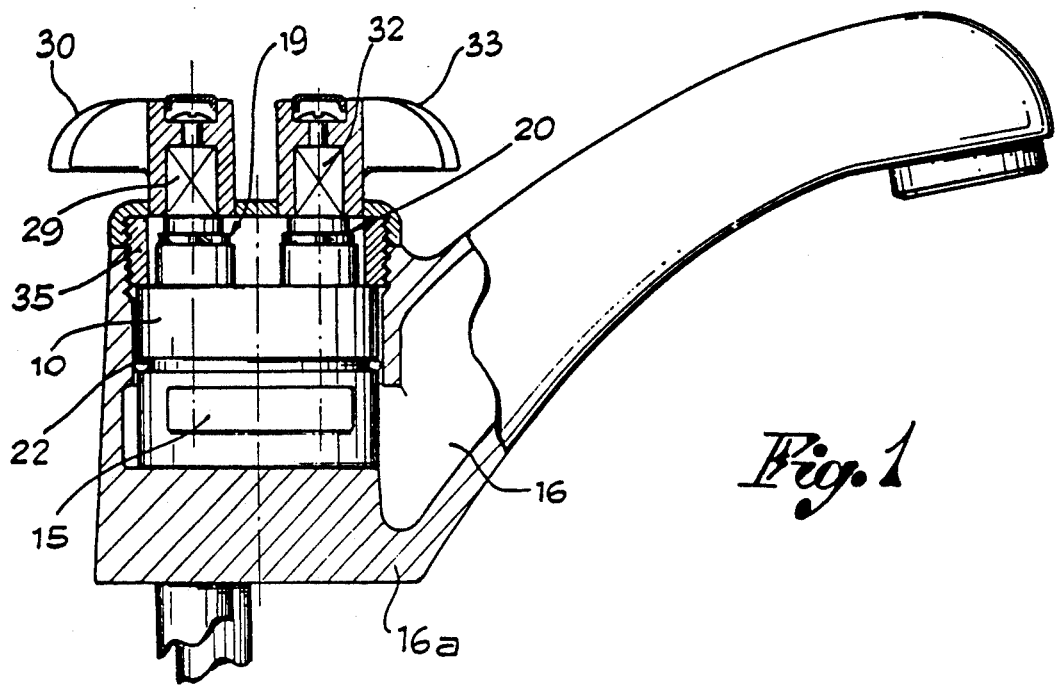
FIG. 1 is a view of the mixer valve, in accordance with the invention, inserted in the body of a tap in partial section.
Figure 3:
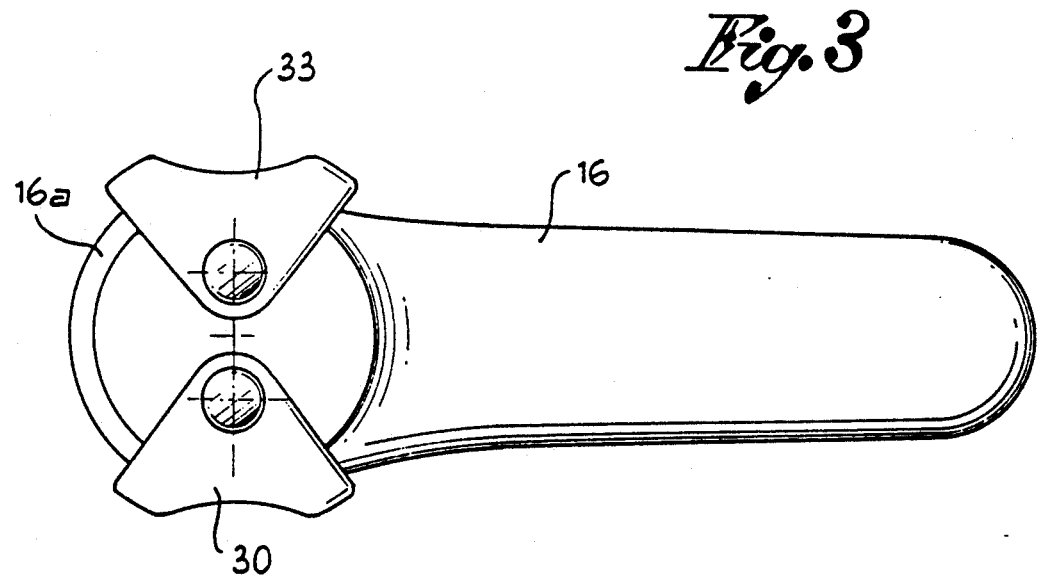
FIG. 3 is a view from above of FIG. 1.
Figure 2:
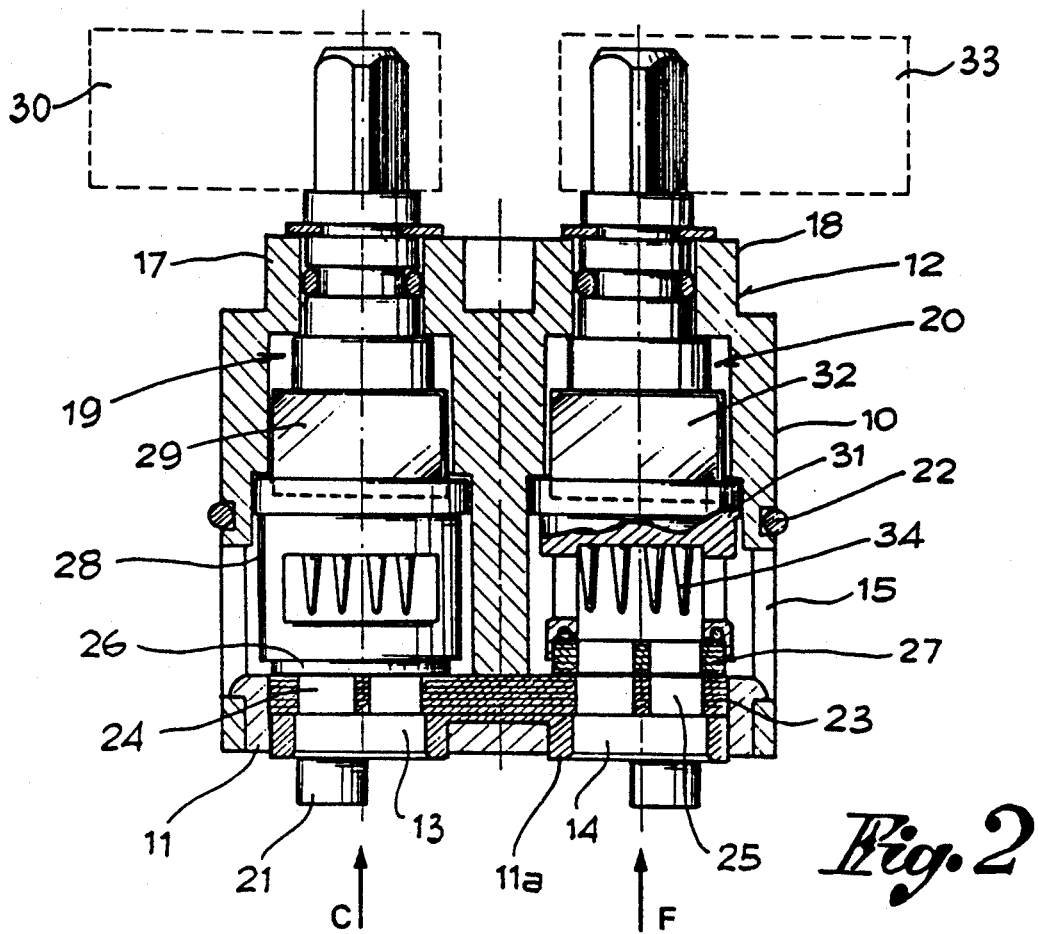
FIG. 2 is a view of the mixer valve in a longitudinal section.
Figure 4:
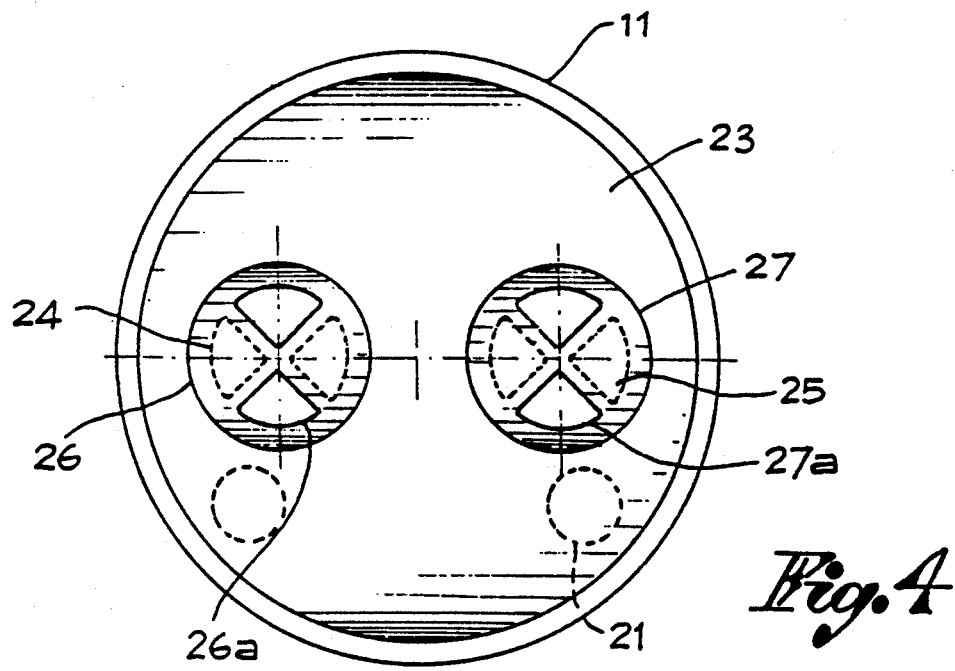
FIG. 4 is a transversal section view of the valve at the rotating plates.

In both cases, the base (11) is provided with two holes (13, 14) which respectively coincide with two pipes (not shown) for the seperate delivery of hot and cold water on the arrows C and F (FIG. 2). The body (10) has lateral openings (15) for the outlet of the water from the valve towards the delivery mouth (16) of a tap (16a) in which the mixer valve is inserted. The lid (12) has two seats or necks (17, 18) each designed to hold a control element (19, 20). Furthermore, the base (11) will have at least one base foot (21) for positioning the valve inside the tap body (16a) and the body (10) will have at least one external seal (22) for the tight fitting of the valve in said body (16a), the seal being above the lateral openings (15) of the cartridge-type body (10).

A fixed plate (23) of ceramic materials or the like is fitted inside said cartridge-type body (10) below the lateral openings (15). The fixed plate (23) rests on the base (11) through a seal (11a) and is radially blocked in order to prevent its rotation in the base itself. Said plate (23) has at least one slit (24) in correspondence to the hole (13) for the inlet of hot water through the base and at least one other slit (25) in correspondence to the hole (14) for the inlet of cold water. The shape of these slits (24, 25) can be varied.

A first disk (26) and a second disk (27), which are spaced from each other, rest against and rotate on the fixed plate (23). Said disks (26, 27) are designed to control and/or intercept the flow of water to be delivered through respective control elements (19, 20).

More, in particular, the first disk (26) is positioned in respect to the slit (24) of the fixed plate (23) and in turn has at least one slit (26a) positionable in correspondence to and away from said slit (24) following the partial rotation, usually of a quarter of a turn, of the disk itself. In order to rotate, the first disk (26) is constrained to an entrainer (28) which rotates but is axially blocked in the body (10) (FIG. 2). The entrainer (28) is connected to a control rod (29) which is inserted in a seat or neck (17) of the lid (12) of the cartridge-type body (10) which has a gripping and operating element (30) splined at the top and configurated so as to limit the rotation of the entrainer and therefore the disk which is constrained to it.

The second rotating disk (27) is positioned in respect to the slit (25) of the fixed plate and in turn has at least one slit (27a) which is also positionable in correspondence to and away from said slit (25) following a rotation of a quarter of a turn of the disk itself. This disk (27) is also rotated by an entrainer (31) with a control rod (32) and an operating element (33) in the same way as the first rotating disk.

The entrainer (28, 31) of each control element (19, 20) of the rotating disks (26, 27) has at least one sluice at the height of the lateral opening of the cartridge-type body (10), said sluice having possible pedunces (34) or other breakflow elements.

The above described valve is fitted in the tap body (16a) in the desired position due to the base foot/feet (21) and is blocked to them through a ring nut (35) which is screwed to said body and engages on the lid of the cartridge-type body (10).

When the valve is set to work, the delivery of hot, cold or mixed water is controlled simply by acting on one, on the other or on both operating elements (30, 33), in other words independently on the mobile plates for their correct rotation on the fixed plate.

I claim:

1. A mixer valve for hot and cold water with two independent controls for the two types of water to be delivered, having a cartridge-type body (10) inside of which are valvular means made from plates in ceramic materials, said cartridge-type body having a base (11) with two holes (13, 14) respectively coinciding with two seperate delivery pipes for hot and cold water and with at least one base foot (21), and a lid at the top, characterized in that:

said cartridge-type body (10) has a fixed plate (23) which rests on and is blocked to the base (11) and is provided with at least a first slit (24) in correspondence to the hole (13) for the inlet of hot water through said base and at least a second slit (25) in correspondence to the hole (14) for the inlet of cold water through said base;

a first rotating disk (26) in relation to the first slit (24) of the fixed plate (23) and a second disk (27) rotating in relation to the second slit (25) of the fixed plate (23) rest against and independently rotate on said fixed plate (23), each disk (26, 27) having at least one slit (26a, 27a) positionable in correspondence to and away from the respective slit (24, 25) of said fixed plate (23) following the rotation of the disk itself;

said disks (26, 27) are independently rotated through two control elements (19, 20) placed inside the cartridge-type body (10) on the axis of the disks themselves and having passages for joining the slits of said rotating disks with lateral openings (15) for the outlet of water formed in the cartridge-type body higher than the rotating disks.

2. A mixer valve as claimed in claim 1, characterized in that the control element (19, 20) for each rotating disk (26, 27) on the fixed plate (23) is placed in a seat formed in the cartridge-type body (10) and has a gripping and operating element (30, 33).

3. A mixer valve as claimed in claims 1 or 2, characterized in that the control element (19, 20) for each rotating disk (26, 27) has an entrainer (28, 31) which is constrained to said rotating disk, turning inside the cartridge-type body but axially blocked, a control rod (29, 32) constrained to said entrainer, turning inside the cartridge-type body and designed to limit the rotation of the entrainer and of said rotating disk, the gripping and operating element being fixed to said control rod, the entrainer having at least one lateral sluice for the passing of water towards the lateral holes (15) of the cartridge-type body.

4. A mixer valve as claimed in claims 1 or 2, characterized in that the cartridge-type body (10) has at least one external seal (22) above its lateral openings.

* * * * *